US011830490B2

(12) United States Patent
Karri et al.

(10) Patent No.: US 11,830,490 B2
(45) Date of Patent: Nov. 28, 2023

(54) MULTI-USER VOICE ASSISTANT WITH DISAMBIGUATION

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Sri Harsha Varada, Vizianagaram (IN); Sampath Kumar Pulupula Venkata, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 17/399,236

(22) Filed: Aug. 11, 2021

(65) Prior Publication Data

US 2023/0051306 A1 Feb. 16, 2023

(51) Int. Cl.
*G10L 15/22* (2006.01)
*G10L 17/06* (2013.01)
(Continued)

(52) U.S. Cl.
CPC ............. *G10L 15/22* (2013.01); *G06F 3/167* (2013.01); *G10L 17/06* (2013.01); *G10L 25/51* (2013.01);
(Continued)

(58) Field of Classification Search
CPC ... G06F 16/90332; G06F 3/167; G10L 15/22; G10L 2015/223; G10L 17/06; G10L 25/51; G10L 2015/225; G10L 2015/227
See application file for complete search history.

(56) References Cited

U.S. PATENT DOCUMENTS 7,050,977 B1 * 5/2006 Bennett .................. G10L 15/30
704/E15.047
10,388,274 B1 * 8/2019 Hoffmeister ........... G06N 3/044
(Continued)

FOREIGN PATENT DOCUMENTS

AU 2012267473 A1 * 1/2014 ............. G06Q 10/02
CA 2823835 A1 * 2/2014 ....... G06F 16/90335
(Continued)

OTHER PUBLICATIONS

"Voice interface responses based on prior user interactions", IP.com No. IPCOM000257361D, IP.com Electronic Publication Date: Feb. 5, 2019, 7 pps., <https://priorart.ip.com/IPCOM/000257361>.
(Continued)

*Primary Examiner* — Mohammad K Islam
(74) *Attorney, Agent, or Firm* — David K. Mattheis

(57) ABSTRACT

Disambiguating question answering responses by receiving voice command data associated with a first user, determining a first user identity according to the first user voice command data, determining a first user activity context according to the first user voice command data, determining a first response for the first user, receiving voice command data associated with a second user, determining a second user identity according to the second user voice command data, determining a second user activity context according to the second user voice command data, determining a second response for the second user, determining a predicted ambiguity between the first response and the second response, altering the first response according to the predicted ambiguity, and providing the first response and the second response.

20 Claims, 4 Drawing Sheets

(51) Int. Cl.
*G10L 25/51* (2013.01)
*G06F 3/16* (2006.01)

(52) U.S. Cl.
CPC .. *G10L 2015/223* (2013.01); *G10L 2015/225* (2013.01); *G10L 2015/227* (2013.01)

(56) References Cited

U.S. PATENT DOCUMENTS

| | | | |
|---|---|---|---|
| 10,515,632 | B2 | 12/2019 | Gilbert |
| 10,592,540 | B2 * | 3/2020 | Liu ..................... G06F 16/3334 |
| 11,086,912 | B2 * | 8/2021 | Gan ........................ G06F 16/00 |
| 2014/0039893 | A1 | 2/2014 | Weiner |
| 2015/0179168 | A1 | 6/2015 | Hakkani-Tur |
| 2017/0103324 | A1 * | 4/2017 | Weston ..................... G06N 3/08 |
| 2019/0005090 | A1 * | 1/2019 | Zhang ..................... G06F 40/30 |
| 2019/0243900 | A1 * | 8/2019 | Gan ........................ G06F 40/30 |
| 2019/0378516 | A1 | 12/2019 | Kline |
| 2019/0392824 | A1 * | 12/2019 | Koo ..................... G06F 16/3347 |
| 2020/0184156 | A1 * | 6/2020 | Badr ........................ G06F 40/35 |
| 2020/0193978 | A1 | 6/2020 | Kline |

FOREIGN PATENT DOCUMENTS

| | | | | | |
|---|---|---|---|---|---|
| CN | 103077165 | A | * | 5/2013 | ............ G10L 15/22 |
| CN | 108536708 | A | * | 9/2018 | ............. G06F 16/00 |
| CN | 108922634 | A | * | 11/2018 | ............. G06F 17/30 |
| CN | 109471927 | A | * | 3/2019 | ........... G06F 40/289 |
| CN | 109543020 | A | * | 3/2019 | ............. G06F 40/30 |
| CN | 109492077 | B | * | 9/2020 | ........... G06F 16/332 |
| DE | 202017107614 | U1 | * | 5/2018 | ............. G06F 3/167 |
| JP | 2004280323 | A | * | 10/2004 | ............. G06F 17/30 |
| KR | 20220108163 | A | * | 8/2022 | ............. G10L 15/22 |

OTHER PUBLICATIONS

Agarwal et al., "Brain—The A.I. (Personal Voice Assistant)", International Research Journal of Engineering and Technology (IRJET), vol. 07, Issue: 04, Apr. 2020, 4 pps.

Mell et al., "The NIST Definition of Cloud Computing", National Institute of Standards and Technology, U.S. Department of Commerce, NIST Special Publication 800-145, Sep. 2011, 7 pages.

Schwartz, "Alexa Developers Can Now Personalize Voice Skills With Names and Phone Numbers", May 28, 2020, 2 pps., <https://voicebot.ai/2020/05/28/alexa-developers-can-now-personalize-voice-skills-with-names-and-phone-numbers/>.

* cited by examiner

MULTI-USER VOICE ASSISTANT WITH DISAMBIGUATION

FIELD OF THE INVENTION

The disclosure relates generally to the machine learning-based question answering systems. The disclosure relates particularly to machine learning-based multi-user question answering systems with user disambiguation.

BACKGROUND

Artificial intelligence (AI) voice assistance systems are being used in various smart houses, offices, public spaces, etc. Users can submit voice commands and accordingly the submitted voice commands will be auto executed. The execution of voice commands can result in a voice reply, operation of one or more machines etc. Multiple users can have access to an AI voice assistance system, and they can submit commands individually and concurrently.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable disambiguating response to multiple users by a question answering system.

Aspects of the invention disclose methods, systems and computer readable media associated with disambiguating question answering responses by receiving voice command data associated with a first user, determining a first user identity according to the first user voice command data, determining a first user activity context according to the first user voice command data, determining a first response for the first user, receiving voice command data associated with a second user, determining a second user identity according to the second user voice command data, determining a second user activity context according to the second user voice command data, determining a second response for the second user, determining a predicted ambiguity between the first response and the second response, altering the first response according to the predicted ambiguity, and providing the first response and the second response.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
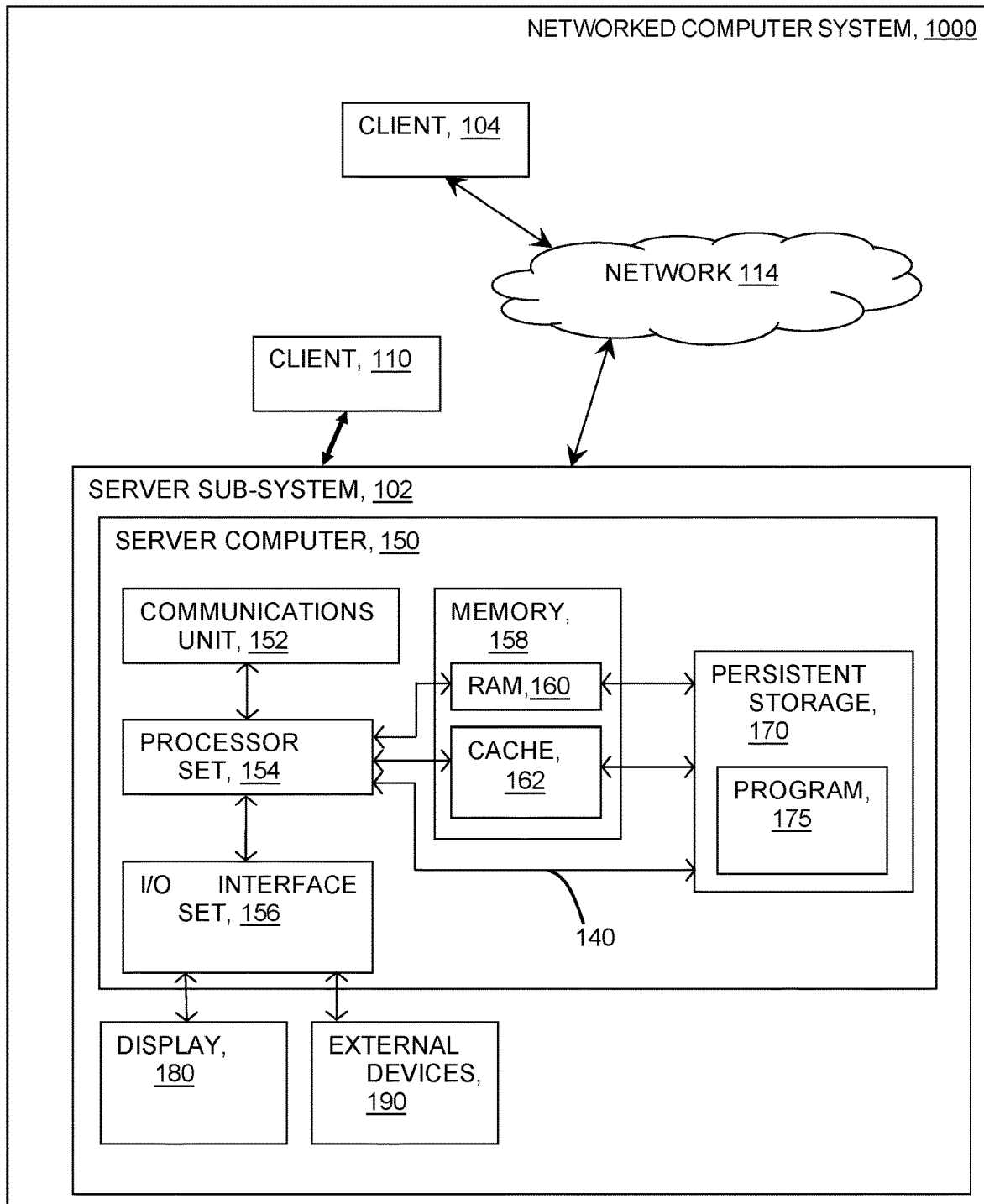
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In any multi-user scenario, if multiple users are concurrently submitting their respective voice commands, and voice replies are also concurrently provided, then individual users may be confused by the replies. At the same time, adding extensive disambiguating information to a reply lengthens the voice reply and creates irritation for the users.

In any multi-user scenario, if multiple voice replies are scheduled to be concurrently provided to different users, the proposed system predicts ambiguity among the responses for the participating users and alters the replies accordingly.

The disclosed AI voice assistance system predicts the contextual situations in the multi-user scenario, using types of questions asked, locations of the question (e.g. home, shopping complex etc.), and accordingly identifies the appropriate mode of disambiguation for the voice replies.

As part of the voice reply disambiguation, disclosed systems identify if the target user's name, or an activity name, should be added to the voice reply, if the tone/texture/pitch of a voice reply should be changed, or if a combination of such actions should be used. In such cases, adding a user's name and an activity name will lengthen the voice reply and will be increase the level of irritation among the participating users.

Disclosed systems use historical learning to predict if there is any ambiguity in the voice reply with the target user or target activity. The disclosed AI voice assistance system dynamically decides whether to add the target user's name or activity name to the voice reply, or if changing the texture/tone/pitch of short voice reply is sufficient.

While replying to any single user, disclosed systems map any specific tone/texture/pitch of the voice replies to the user, and then uses the mapped tone/texture/pitch to provide short replies for subsequent conversations with that user.

Disclosed systems identify an appropriate temporal gap between the two individual voice replies targeting two different users, so that the targeted users can individually recognize their respective voice replies. Disclosed systems create an appropriate temporal gap between two voice replies to avoid confusing the participating users by the subsequent voice command.

For any voice reply targeted for multiple users, based on the number of users present in the surroundings and the number of target users, disclosed systems dynamically decide to mention the target users' names, or not.

For any voice reply delegated for a different user, disclosed systems recognize the delegated user and refer to the delegated user by name while replying to the voice command.

Based on historical user responses to replies lengthened by adding the user's name and activity name, disclosed systems identify the level of irritation with the lengthened responses, and accordingly when there is no predicted ambiguity, disclosed systems remove the name of the target user, or activity name, and use only voice modulation while replying.

In a multi-user environment, disclosed systems trigger a configurable time-lapsed buzzer on the wearables of the intended listeners, so that they know that they should listen to a voice assistance reply.

In an embodiment, when there are multiple voice assistants, all of them share information on tone preferences for identified individuals. For example: voice responses for person A from each of the voice assistants use the same modulation.

Each voice assistant system predicts the chance of ambiguity between voice assistants, e.g., where a single user expects a response from multiple voice assistants at a given point of time. If there is no predicted ambiguity, the assistant will respond with a simple voice that is mapped to the user, otherwise the assistant adds a prefix sound (e.g., lalala. goug. etc.,) which basically helps to identify the responding device.

Aspects of the present invention relate generally to question answering systems and, more particularly, to disambiguating responses to multiple users by a question answering system. In embodiments, a question answering (QA) system receives multiple questions from multiple users of one or more user devices, identifies the users, and unique contexts for each question posed, determines answers for the questions, predicts an ambiguity between the responses, alters at least one of the responses to reduce the ambiguity, and provides the responses. to the users. According to aspects of the invention, the QA system automatically and dynamically adjusts the manner in which responses are altered according to the users present, the predicted ambiguity, and previous interactions with identified users. In this manner, implementations of the invention learn and continually adjust the manner in which responses for each user are best disambiguated.

In accordance with aspects of the invention there is a method for automatically adjusting concurrent generated response to disambiguate those responses for multiple concurrent system users. The method includes: concurrently receiving voice command data from multiple users by the system; determining user identities and question contexts for the respective portions of voice command data, determining generated responses for each received voice command, predicting a level of ambiguity among the generated responses, altering one or more of the generated responses according to the level of ambiguity predicted by adding a user name, an activity name, or altering the tome/texture/pitch, etc., of each response to match preferences or characteristics for responses associated with each identified user.

Aspects of the invention provide an improvement in the technical field of QA systems. Conventional QA systems receive voice command data, generate responses and provide the generated responses. Upon receiving multiple concurrent questions, such systems generate a response for each received question and provide the responses, potentially in an ambiguous manner leading to user irritation and/or confusion. Disclosed embodiments, receive concurrent questions, determine responses, determine a level of ambiguity of the responses, and alter at least one response to reduce the level of ambiguity by adding a user name, activity names or details, or altering the voice used for the reply to match a voice mapped to the particular user who posed the associated question.

Aspects of the invention also provide an improvement to computer functionality. In particular, implementations of the invention are directed to a specific improvement to the way QA systems operate in responding to multiple concurrent users, embodied in the identification of users and question contexts, the generation of responses, the prediction of response ambiguity, and the alteration of responses to reduce the ambiguity. In embodiments, the system adjusts the response preferences of a user according to the user's historical reaction to various disambiguation efforts. As a result of adjusting the preferences for a user, the system alters the manner in which current and future responses are altered for each user. In this manner, embodiments of the invention affect how the QA system functions (i.e., the likelihood of providing ambiguous answers to multiple concurrent questions) from one multi-user session to the next.

As an overview, a QA system is an artificial intelligence application executed on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area (e.g., financial domain, medical domain, legal domain, etc.) where the body of knowledge (knowledgebase) can be organized in a variety of configurations, such as but not limited to a structured repository of domain-specific information, such as ontologies, or unstructured data related to the domain, or a collection of natural language documents about the domain.

In an embodiment, one or more components of the system can employ hardware and/or software to solve problems that are highly technical in nature (e.g., receiving voice command data, identifying users and question contexts, generating response to questions, predicting ambiguity among multiple concurrent responses, altering responses to reduce ambiguity, etc.). These solutions are not abstract and cannot be performed as a set of mental acts by a human due to the processing capabilities needed to facilitate disambiguating multiple concurrent responses, for example. Further, some of the processes performed may be performed by a specialized computer for carrying out defined tasks related to response disambiguation. For example, a specialized computer can be employed to carry out tasks related to disambiguating multiple concurrent responses, or the like.

In an embodiment, user A (Alice), and user B (Bob), each utilize a common AI question answering system of the invention through a device, such as a smartphone, tablet computer, or other system networked device including a microphone and a speaker. Each of the users registers with the system and provides voice data samples along with their identifying information. The system uses the voice data samples to create a voice signature for each user by, for example, training a machine learning classification model using the labeled voice data samples provided by the system users. The system optionally retains a user preference for a synthetic voice used for responses to user queries. Each user indicates their particular voice preferences. In an embodiment, the system stores such voice preferences in a user profile. In an embodiment, the system reserves unique voice characteristics for each successive user such that each user has a different set of preferences and each successive user is constrained to select unchosen sets of preferences for their use. In an embodiment, the system tracks selected voice preferences and generates a unique voice preference set as a default for each new user. The new user may alter the generated preference subject to the selections made by previous registered users.

In an embodiment, the system shares user voice preferences across multiple different devices using respective device application programming interfaces such that all devices utilize similar synthetic voices in responding to specific users.

Alice asks questions relating to a science presentation she is preparing, and Bob asks questions relating to a recipe he is preparing for dinner. Each of Alice and Bob pose questions to the system through the device. The system generates answers to the questions and provides replies to each of Alice and Bob. In some instances, the temporal spacing of the respective questions reduces or removes any risk of ambiguity in the provided answers. Alice asks a question and receives her answer before Bob asks a question. In some instances, Alice and Bob ask questions concurrently. The system QA portion generates answers and predicts that there may be ambiguity for Alice and Bob due to the timing of the questions, i.e. the short temporal spacing between the questions. In this embodiment, the system alters one or both of the generated responses to reduce the possible ambiguity in the answers for Alice and Bob. For example, the system utilizes a first voice in providing the answer to Alice, and a second, different voice in providing the answer for Bob. In an embodiment, each of the voices used is associated with the particular user by the system. In other words, the system maintains a database of voice characteristics for identified users, the database includes the characteristics for the synthetic voice for each identified user, e.g. a voice for responding to Alice, and a voice for responding to Bob.

In an embodiment, the system receives voice command data from a user through the networked device including the microphone. In this embodiment, the system converts the user's audio input to digital audio and then converts the digital audio data to text using speech to text programming. The system further analyzes the vocal characteristics of the digital audio to identify the user using a machine learning classification model trained with voice samples from prospective system users. The classification model receives the digital audio data and identifies the user. In an embodiment where multiple users provide voice samples, the system provides an output including one or more user identities and a classification confidence score for the provided identities. The system ranks the identities according to the respective confidence scores and selects the identity having the highest confidence score for use in generating synthesized responses.

In an embodiment, the system passes the text corresponding to the voice command data to natural language processing (NLP) or natural language understanding (NLU) programming for evaluation. Disclosed embodiments can perform natural language processing for extraction of NLP output parameter values from received voice data of a user, as well as response data from a QA system output. NLP includes performing one or more of a topic classification process that determines topics of messages and outputs one or more topic NLP output parameter value, a sentiment analysis process which determines sentiment parameter value for a message, e.g., polar sentiment NLP output parameters, "negative," "positive," and/or non-polar NLP output sentiment parameters, e.g., "anger," "disgust," "fear," "joy," and/or "sadness" or other classification process for output of one or more other NLP output parameter values, e.g., one of more "social tendency" NLP output parameter or one or more "writing style" NLP output parameter, and/or one or more part of speech NLP output parameter value. Part-of-speech tagging methodologies can include use of, e.g., Constraint Grammar, Brill tagger, Baum-Welch algorithm (the forward-backward algorithm) and the Viterbi algorithm which can employ use of the Hidden Markov models. Hidden Markov models can be implemented using the Viterbi algorithm. The Brill tagger can learn a set of rule patterns, and can apply those patterns rather than optimizing a statistical quantity. Applying natural language processing can also include performing sentence segmentation which can include determining where a sentence ends, including, e.g., searching for periods, while accounting for periods that designate abbreviations.

The NLP output provides one or more user intents and/or entities associated with the voice command. The QA system determines an activity context for the question from the NLP output. In some instance the voice command data includes explicit reference to an activity: "Hello, I need some help with making eggplant parmesan", or other explicit declarations regarding the user's activity.

The QA system also generates a response for the user's command input according to the NLP output intents and/or entities, according to the corpus of knowledge used in training the machine learning model utilized by the QA system.

In interacting with each user individually, the system utilizes the unique voice generated using the voice preferences associated with the user. The system further evaluates the receptivity of each user to various response formats, including adding the user's name to each response and adding activity context to each response. The system evaluates user responses to each format using NLP sentiment analysis. The system notes user's having increased irritation in response to the use of the respective response formats. The system stores the user's receptivity to response formats as part of the user's profile.

In a multi-user environment, the system receives voice command data from multiple users, identifies each user from their voice signature, associates each voice command with the identified user's name, and determines the activity context for each received voice command using the NLP outputs for the received data. The system generates a response for each user according to the NLP output and the trained QA response generation model. The system determines a context for each response of a set of generated responses. As an example, for each user, the system determines from the activity context whether the generated response(s) includes a series of steps to be followed and an accompanying set of responses to be provided to the user along a timeline, or other generated response activity context.

In an embodiment, the system predicts ambiguity for the responses generated for multiple users. The system considers the timing of commands from multiple users, or the duration of time between questions from each of multiple users. The predicted ambiguity level increases as the inverse of the duration such that shorter durations between commands from multiple users increases the predicted ambiguity for the corresponding set of generated commands.

In an embodiment, the system predicts a generated response ambiguity level by considering a time stamp of each question as well as a predicted proximity of each user submitting a query, as well as considering the similarity of the queries as determined indicated by comparing the NLP outputs—such as multiple users in a retail setting asking a similar question—"What is the price of this item?". Multiple users in the same location asking similar short questions with clear but overlapping intents resolve to a high predicted response ambiguity.

In an embodiment, the system considers the input device for each received command in predicting ambiguity. Instances where each user provides commands through a different device and potentially receives responses through a different device have a lower level of predicted ambiguity. Instances where multiple users provide commands and receive generated responses using a common device have higher levels of predicted ambiguity.

In an embodiment, the system considers user responses in predicting ambiguity. User responses to system generated responses indicating confusion as a sentiment, or asking for a response to be repeated, or seeking clarification of a response, as an intent, increase the predicted level of ambiguity.

For multi-user instances wherein the predicted ambiguity level exceeds a defined threshold, such as 50%, the system alters one or more of the generated responses to reduce the predicted ambiguity. For example, Alice and Bob seek help at the same time, or within a small time window, such as fifteen seconds of each other. The generated response each include a listing of steps to be followed along timelines, leading a predicted ambiguity level exceeding a defined 50% threshold. The system determines that disambiguation steps should be applied to the responses for each of Alice and Bob to diminish the predicted level of ambiguity.

In this embodiment, the system checks the user profiles of Alice and Bob for their respective voice preferences and receptivity to various response formats. As one example, the system verifies that the voice preferences of Alice and Bob do not overlap and proceeds using their respective voice preferences to disambiguate the combined set of responses. As another example, the system determines that the respective voice preferences overlap and do not reduce the predicted ambiguity. The system further notes that each of Alice and Bob are receptive to the addition of their name to responses. The system then adds each user's name to their responses to disambiguate the combined responses. As a worst-case example, the system notes that registered users Curt and Kirk have similar voice preferences and aversions to lengthened formats including names and activity context information. In this example, the system determines that adding user's names does not provide sufficient ambiguity reduction and adds activity context to each response of the set of combined responses to reduce the level of response ambiguity.

In an embodiment, system users have not registered or provided voice data for the development of user voice signatures. In this embodiment, the system determines that the users are not associated with any user profiles and generates anonymous user profiles for each unknown user. The profiles include unique voice preferences constrained by previously selected preferences and also contain no data regarding response format receptivity for the unknown users. When predicted ambiguity levels for responses including such unknown users exceed defined thresholds, the system checks the respective voice preferences for each of the multiple users, including any unknown users to determine if the voice preferences alone provide sufficient response disambiguation. For instances where voice preferences alone are insufficient, the system adds activity context data to responses directed toward the unknown user. The system tracks responses of the unknown users to the lengthened responses, and updates the anonymous profile of each unknown user according to the NLP sentiment analysis of their respective responses to different generated response formats.

In an embodiment, where a single user submits multiple commands, each command tied to a different activity, the system identifies the user, if known, and activity context for each command. The system predicts an ambiguity level for the respective responses based upon the generated response content and the activity context. The system adds activity context data to generated responses as needed to reduce the predicted level of ambiguity. As an example, comparison of the NLP analysis of the respective responses or response streams indicates similar intents in the responses and a lack of entities without the addition of activity context data.

In an embodiment, the system receives vector outputs from the NLP model and determines distances between the respective responses or response streams. Small distance separations between the vectors indicate higher ambiguity levels. In this embodiment, the method uses a similarity between NLP outputs, based on the text of the outputs. Examples of methods of determining the similarity of text-based data include Jaccard distance, Cosine distance, Euclidean distance, and similar known methods. In this embodiment, the addition of activity context data to generated responses increases the distance between generated responses beyond a defined threshold.

In an embodiment, the system evaluates the multiple voice commands to determine if there is overlap in the activity context of the commands. For commands with overlapping context, the system generates an aggregated response to the combination of commands. The system then evaluates the aggregated response together with any other concurrent responses to determine a predicted level of response ambiguity. The system then proceeds as outlined above when the predicted level of ambiguity exceeds a defined threshold. In this embodiment, the system considers the users associated with the aggregated response and those users associated with other responses. For combined responses having high levels of predicted ambiguity, the system may add multiple user names or activity contexts to the aggregated responses.

After altering one or more responses to reduce the predicted likelihood of ambiguity, the system provides the responses to the users through the speaker of a networked device. The system converts the text of the generated responses to speech using speech to text programming and the voice preferences of each user as appropriate.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise disambiguation program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the disambiguation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, a speaker, and/or some other suitable input or output device. External devices 190 enable user interactions with the programs executing the disclosed methods and External device(s) 190 can also include portable computer readable storage media such as, for example, thumb drives, portable optical or magnetic disks, and memory cards. Software and data used to practice embodiments of the present invention, e.g., disambiguation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer. Display 180 enables user interactions with the programs executing the disclosed methods.

Figure 2:
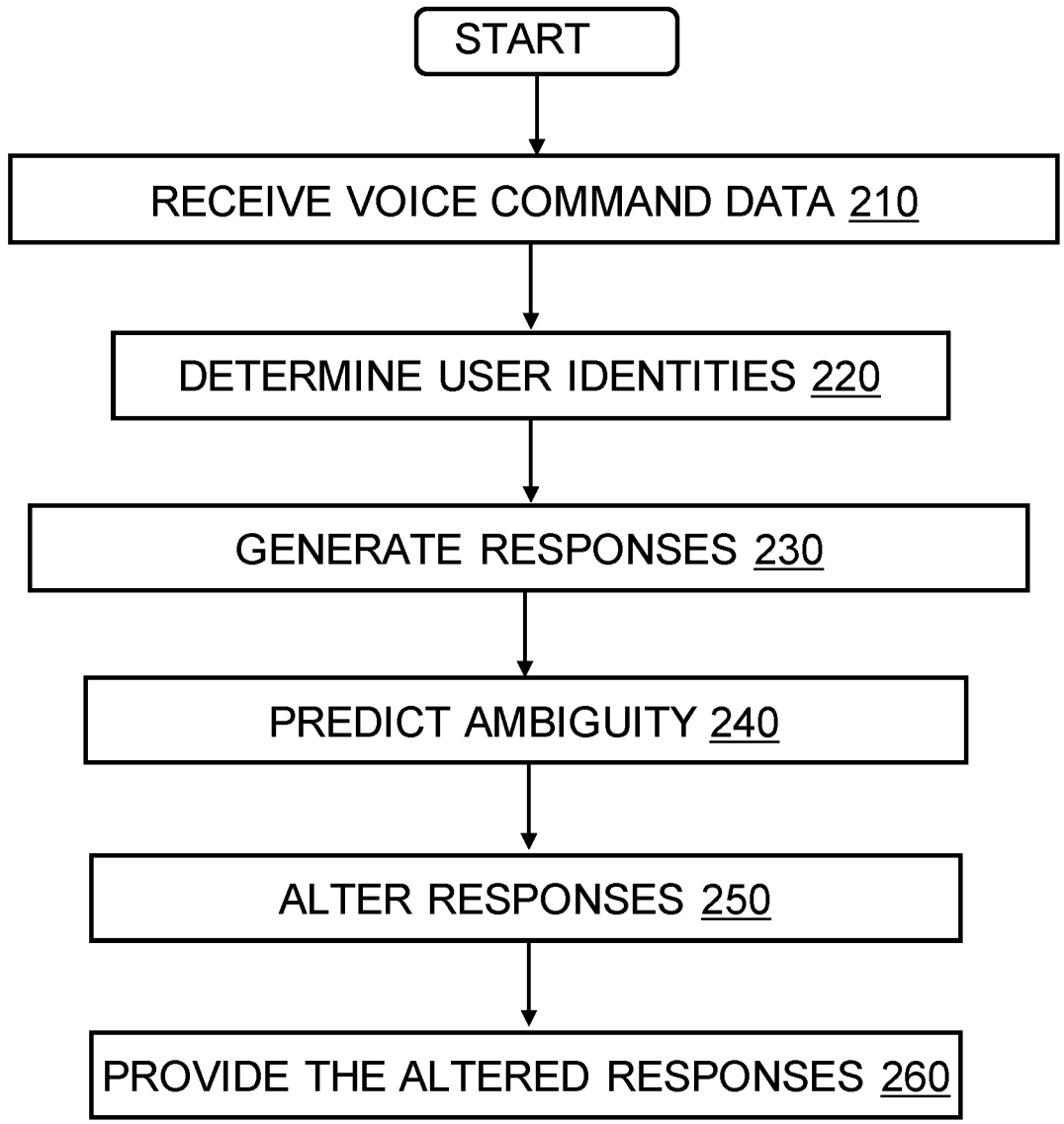
FIG. 2 provides a flowchart depicting an operational sequence, according to an embodiment of the invention.

FIG. 2 provides a flowchart 200, illustrating exemplary activities associated with the practice of the disclosure. After program start, at block 210, the method receives voice command data from one or more users of the system. The voice command data includes user voice data collected by a device microphone, converted to digital audio data and further converted from speech to text using appropriate programming by one or more processor sets 154 of the system of FIG. 1.

At block 220, the method of multi-user disambiguation program 175 identifies the users associated with the voice command data. For registered users, the method classifies the digital audio data of the voice commands using one or more machine learning classification models and returns a user's name identified with the data. For unregistered users, the method defines an anonymous user profile including the voice signature derived from the voice command data and default response voice preferences.

At block 230, the method of multi-user disambiguation program 175 generates a response for each received voice command by providing the text derived from the command data as input to NLP analysis and providing the NLP analysis output to the QA process of the system. The QA process generates text responses to each received command.

At block 240, the method predicts a level of ambiguity for the set responses generated by the QA process. The method considers the temporal spacing of the voice commands, the activity contexts of the commands, the proximity of the users to each other, whether the commands were all received from the same device, identified user names, the generated response texts, and the response voice preferences for the identified users, in predicting the level of response ambiguity.

At block 250, the method alters one or more responses for sets of responses having a predicted level of ambiguity exceeding a defined threshold, such as 50%. For these responses the method evaluates the overlap between response voice preferences of the relevant users, as well as the receptivity of the users to the use of responses lengthened through the addition of user names and activity context data to each response. The method alters the responses as little as possible, ranging from altering the response voices for each user to adding user names to responses to adding activity context, to adding both user names and activity context. After altering the generated responses, the method predicts the level of ambiguity of the set of responses and compares the prediction to the defined threshold. For responses having predicted ambiguity above the threshold, the method further alters the response and again predicts the ambiguity. The method iterates in this manner until the predicted ambiguity of the set of responses falls below the defined threshold.

At block 260, the disambiguation method provides the set of combined responses to the users. The method converts the final altered text of the responses to speech data using text to speech programming and the response voice preferences of each user. The method provides the responses using one or more networked device speakers to output the text to speech data to the users.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
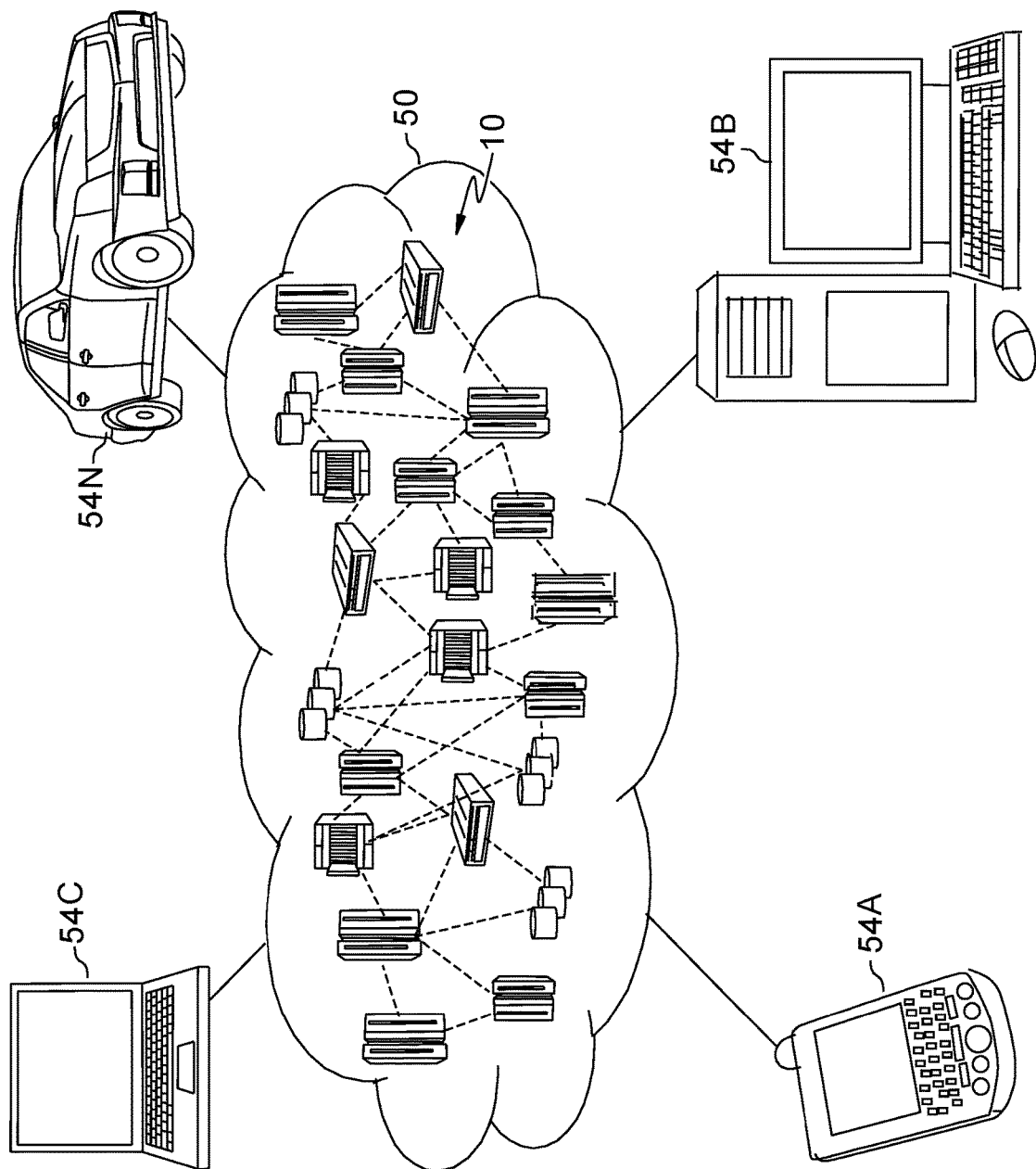
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
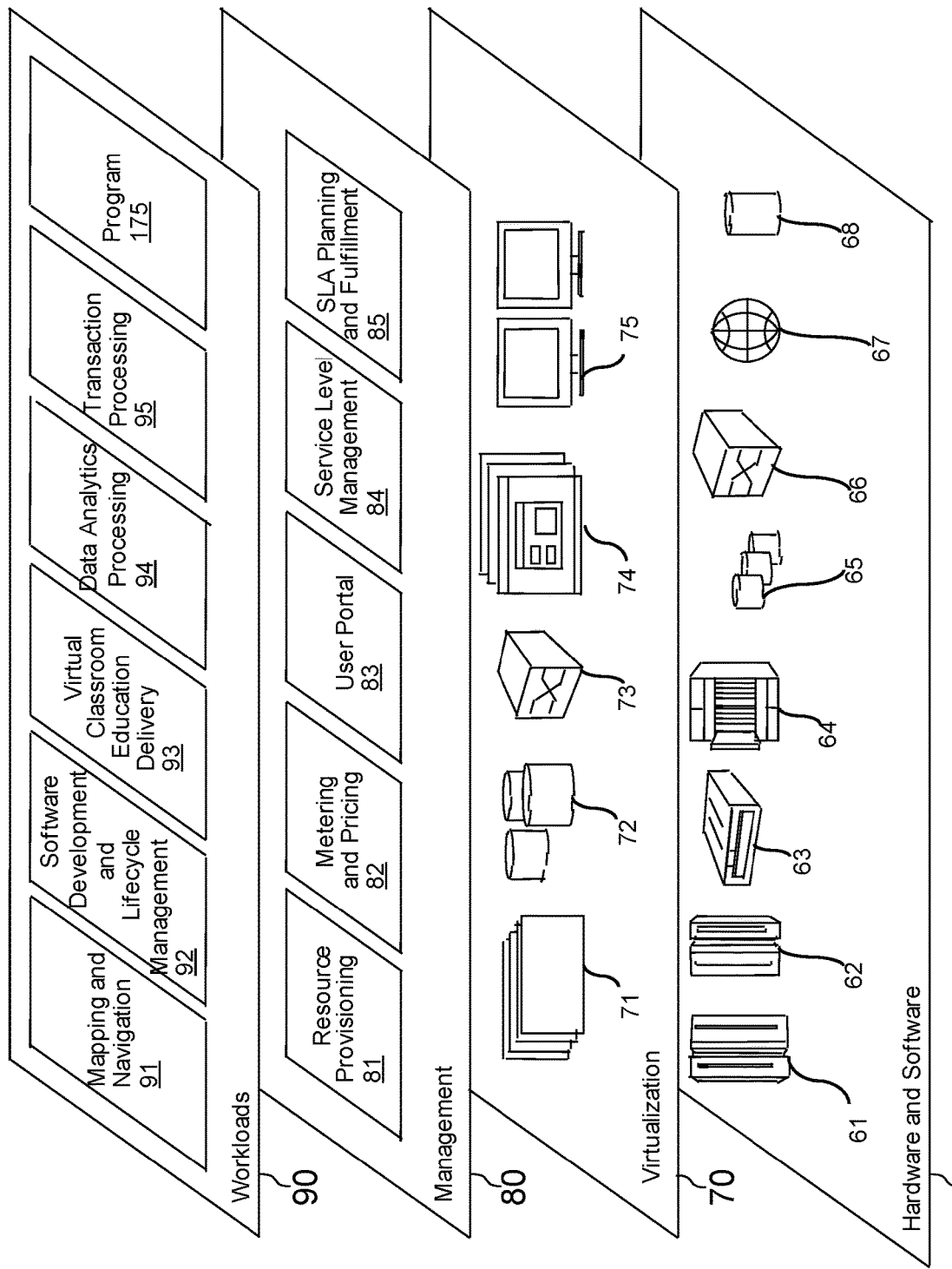
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and disambiguation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for disambiguating question answering responses, the method comprising:
   receiving, by one or more computer processors, voice command data associated with a first user;
   determining, by the one or more computer processors, a first user identity according to the first user voice command data;
   determining, by the one or more computer processors, a first user activity context according to the first user voice command data;
   determining, by the one or more computer processors, a first response for the first user;
   receiving, by the one or more computer processors, voice command data associated with a second user;
   determining, by the one or more computer processors, a second user identity according to the second user voice command data;
   determining, by the one or more computer processors, a second user activity context according to the second user voice command data;
   determining, by the one or more computer processors, a second response for the second user;
   determining, by the one or more computer processors, a predicted ambiguity between the first response and the second response;
   altering, by the one or more computer processors, the first response according to the predicted ambiguity; and
   providing, by the one or more computer processors, the first response and the second response.

2. The computer implemented method according to claim 1, further comprising:
   receiving, by the one or more computer processors, voice data from a first user;
   associating, by the one or more computer processors, the voice data with a first identity for the first user; and
   determining, by the one or more computer processors, the first response for the first user according to the first identity.

3. The computer implemented method according to claim 1, wherein altering the first response comprises adding a name of the first user to the first response.

4. The computer implemented method according to claim 1, wherein altering the first response comprises adding an activity of the first user to the first response.

5. The computer implemented method according to claim 1, wherein altering the first response comprises altering a characteristic of a voice used for the first response.

6. The computer implemented method according to claim 1, further comprising providing, by the one or more computer processors, the second response to the second user.

7. The computer implemented method according to claim 1, further comprising determining, by the one or more computer processors, the predicted ambiguity level according to historic data.

8. A computer program product for disambiguating question answering responses, the computer program product comprising one or more computer readable storage devices and collectively stored program instructions on the one or more computer readable storage devices, the stored program instructions comprising:

program instructions to receive voice command data associated with a first user;

program instructions to determine a first user identity according to the first user voice command data;

program instructions to determine a first user activity context according to the first user voice command data;

program instructions to determine a first response for the first user;

program instructions to receive voice command data associated with a second user;

program instructions to determine a second user identity according to the second user voice command data;

program instructions to determine a second user activity context according to the second user voice command data;

program instructions to determine a second response for the second user;

program instructions to determine a predicted ambiguity between the first response and the second response;

program instructions to alter the first response according to the predicted ambiguity; and program instructions to provide the first response and the second response.

9. The computer program product according to claim 8, the stored program instructions further comprising:

program instructions to receive voice data from a first user;

program instructions to associate the voice data with a first identity for the first user; and program instructions to determine the first response for the first user according to the first identity.

10. The computer program product according to claim 8, wherein altering the first response comprises adding a name of the first user to the first response.

11. The computer program product according to claim 8, wherein altering the first response comprises adding an activity of the first user to the first response.

12. The computer program product according to claim 8, wherein altering the first response comprises altering a characteristic of a voice used for the first response.

13. The computer program product according to claim 8, the stored program instructions further comprising program instructions to provide the second response to the second user.

14. The computer program product according to claim 8, the stored program instructions further comprising program instructions to determine the predicted ambiguity level according to historic data.

15. A computer system for disambiguating question answering responses, the computer system comprising:

one or more computer processors;

one or more computer readable storage devices; and stored program instructions on the one or more computer readable storage devices for execution by the one or more computer processors, the stored program instructions comprising:

program instructions to receive voice command data associated with a first user;

program instructions to determine a first user identity according to the first user voice command data;

program instructions to determine a first user activity context according to the first user voice command data;

program instructions to determine a first response for the first user;

program instructions to receive voice command data associated with a second user;

program instructions to determine a second user identity according to the second user voice command data;

program instructions to determine a second user activity context according to the second user voice command data;

program instructions to determine a second response for the second user;

program instructions to determine a predicted ambiguity between the first response and the second response;

program instructions to alter the first response according to the predicted ambiguity; and program instructions to provide the first response and the second response.

16. The computer system according to claim 15, the stored program instructions further comprising:

program instructions to receive voice data from a first user;

program instructions to associate the voice data with a first identity for the first user; and program instructions to determine the first response for the first user according to the first identity.

17. The computer system according to claim 15, wherein altering the first response comprises adding a name of the first user to the first response.

18. The computer system according to claim 15, wherein altering the first response comprises adding an activity of the first user to the first response.

19. The computer system according to claim 15, wherein altering the first response comprises altering a characteristic of a voice used for the first response.

20. The computer system according to claim 15, the stored program instructions further comprising program instructions to provide the second response to the second user.

* * * * *